United States Patent [19]

Ohshima

[11] Patent Number: 4,992,932
[45] Date of Patent: Feb. 12, 1991

[54] DATA PROCESSING DEVICE WITH DATA BUFFER CONTROL

[75] Inventor: Toshiharu Ohshima, Kawasaki, Japan

[73] Assignee: Fujitsu Limited, Kawasaki, Japan

[21] Appl. No.: 290,335

[22] Filed: Dec. 27, 1988

[30] Foreign Application Priority Data

Dec. 29, 1987 [JP] Japan .................................. 62-333719

[51] Int. Cl.$^5$ ........................... G06F 9/06; G06F 9/30; G06F 9/32
[52] U.S. Cl. .................................. 364/200; 364/261.3; 364/261.7; 364/263.1; 364/244; 364/264.3
[58] Field of Search ... 364/200 MS File, 900 MS File

[56] References Cited

U.S. PATENT DOCUMENTS

| | | | |
|---|---|---|---|
| 3,401,376 | 9/1968 | Barnes | 364/200 |
| 3,551,895 | 12/1970 | Driscoll | 364/200 |
| 3,924,245 | 12/1975 | Eaton et al. | 364/200 |
| 4,583,163 | 4/1986 | Kobayashi | 364/200 |

FOREIGN PATENT DOCUMENTS

60-117336  6/1985  Japan .

Primary Examiner—David Y. Eng
Attorney, Agent, or Firm—Armstrong, Nikaido, Marmelstein, Kubovcik & Murray

[57] ABSTRACT

A data processing device having a buffer for prefetching a plurality of instructions. The buffer is constructed by including two switching areas and one common area connecting to one of the two switching areas. An unconnected switching area of the two switching areas is used exclusively for prefetching a destination instruction of a conditional jump instruction, so that the destination instruction is prefetched to the unconnected switching area by a switching operation. Thus flexibility is increased, when the jump instructions are continued. Further, a number of prefetching destination instructions is determined so that a bottleneck in an instruction process is avoided, and thus the capacity of the two switching areas is reduced the hardware scale is not enlarged.

19 Claims, 7 Drawing Sheets

DATA PROCESSING DEVICE WITH DATA BUFFER CONTROL

BACKGROUND OF THE INVENTION

1. Field of the Invention

The present invention relates to a data processing device, more particularly, to a data processing device using an instruction prefetch system.

The processing speed of a data processing device, e.g., a microprocessor unit, has become much higher due to the use of pipeline processing, etc. In the pipeline process, however, a plurality of processes are carried out in parallel, and therefore, the speed is too slow to enable the data processing device to successively fetch instructions one by one from a storage portion by one process.

To solve this problem, "an instruction prefetch" is carried out, to increase the processing speed and thus avoiding a bottleneck in the processing of instructions. In the instruction prefetch, a plurality of continuous instructions are read from an external memory and stored to an internal instruction buffer, and an instruction to be processed is fetched from the buffer when necessary.

Note, in the processing by the data processing device, usually the continuous instructions are successively carried out in accordance with the address numbers thereof, but in a different kind of processing, a conditional branch processing is carried out. Namely, in the conditional branch processing, a condition of a conditional jump instruction is discriminated, and another instruction at another address is carried out when the condition of the conditional jump instruction is fulfilled. In such a conditional branch processing, an instruction to be carried out can not be stored in the buffer by a discriminated result of the conditional jump instruction, and therefore, in this case, the instruction must be fetched again from the external memory, and thus a bottleneck in the instruction processing occurs during the time required for this fetch and the processing speed is lowered.

2. Description of the Related Art

The conventional methods of conditional branch processing are indicated, for example, as follows:

(I) When a condition of a conditional jump instruction is not fulfilled by a discriminated result of the condition thereof, a next instruction is carried out. When a condition of a conditional jump instruction is fulfilled by a discriminated result of the condition of the conditional jump instruction, a prefetch instruction buffer is cleared and a destination instruction (branch-target instruction) of the conditional jump instruction is read from a memory and prefetched into the instruction buffer.

(II) A first prefetch instruction buffer and a second prefetch instruction buffer having the same capacities are provided, and in a normal state, one of the instruction buffers (for example, the first buffer) is used. When a conditional jump instruction is detected, a destination instruction is read from a memory and is stored to the second prefetch instruction buffer, and when a discriminated result of the condition thereof indicates a branch condition, the second prefetch instruction buffer is selected and the first prefetch instruction buffer is cleared. Conversely, when a discriminated result of the condition of the conditional jump instruction does not indicate a branch condition, the first prefetch instruction buffer is selected and the second prefetch instruction buffer is cleared.

(III) Furthermore, in the above case (II), one of the buffers is used as an exclusive prefetch instruction buffer and the capacity thereof is kept to a minimum, so that a hardware scale thereof is kept small.

In the case of (I), when the discriminated result of the condition of the conditional jump instruction is a branch condition, in this method the buffer must be cleared and a destination instruction read, and thus it is difficult for this method to avoid a bottleneck in the instruction processing. Next, in the case of (II), a bottleneck in an instruction processing can be avoided, but another problem arises in that two buffers having the same capacities must be provided, and thus the hardware scale thereof becomes very large.

On the other hand, in the case of (III), a bottleneck in an instruction processing can be avoided, and a hardware scale thereof kept to a minimum, since the capacity of the exclusive prefetch instruction buffer is determined by a destination instruction. Nevertheless, in this case (III), when conditional jump instructions are continued, for example, a condition of a first conditional jump instruction is fulfilled and a second conditional jump instruction appears, and just after instructions of the second conditional jump instruction are stored in the exclusive prefetch instruction buffer, it is difficult for this method to flexibly carry out these instructions. For example, if a condition of the second conditional jump instruction is not fulfilled, the just after instructions of the second conditional jump instruction should not be cleared, whereby the exclusive prefetch instruction buffer is not cleared and a destination instruction of the second conditional jump instruction cannot be fetched into the exclusive prefetch instruction buffer. Therefore, in this method the instructions from the exclusive prefetch instruction buffer must be transferred to a normal buffer, and thus it is difficult in this method to avoid a bottleneck in an instruction processing.

Furthermore, a branch instruction control system is provided for reducing the quantity of hardware, to decrease the delay and to realize a high-speed machine cycle by carrying out the prefetch control for a destination instruction while a branch instruction is being processed, as disclosed in Japanese Unexamined Pat. Publication No. 60-117336. But, in this Japanese Pat. Publication No. 60-117336, instructions read from an instruction memory means, e.g., a main memory or a instruction cache memory, are momentarily stored to a plurality of instruction word registers (IWR), the instruction word registers are connected directly to a multiplexer (MPX) and to the input of a plurality of instruction buffer registers (IBR), and the instructions stored in the IWR and IBR are selected by the MPX and applied to a pipeline system. In this branch instruction control system, however, the instructions are not written and read by using a write pointer and a read pointer as a register file configuration, but are written or read by using a shift register configuration. Therefore, the quantity of hardware in this branch instruction control system cannot be less than that needed when using a register file configuration.

SUMMARY OF THE INVENTION

In consideration of the above-mentioned problems, an object of the present invention is to provide a data processing device for carrying out instructions with flexibility and without large scale hardware, when conditional jump instructions are continued.

According to the present invention, there is provided a data processing device having a buffer portion for prefetching a plurality of instructions previously fetched from a memory portion, and successively reading and decoding the instructions of the buffer portion and carrying out various processes in accordance with the decoded instructions. The buffer portion comprises two switching areas and one common area, and one of the two switching areas is combined with the common area and the instructions from the memory portion are prefetched to the combined areas formed by one of the two switching areas and the common area. When a conditional jump instruction is detected, a destination instruction corresponding to the conditional jump instruction is prefetched from the memory portion to the other of the two switching areas. Furthermore, when a condition of the conditional jump instruction is fulfilled, the instructions prefetched to the combined areas are invalidated and the other of the two switching areas is combined with the common area.

In the buffer portion, one of the two switching areas is combined with the common area and the instructions from the memory portion are prefetched to the combined areas, during a normal state for carrying out continuous instructions. On the other hand, when a conditional jump instruction (for example, a Branch on Condition Code: Bcc instruction) is detected, the destination instruction read from the memory portion to the other switching area which is not combined with the common area is prefetched. Further, when a branch condition of a conditional jump instruction is fulfilled, the instructions prefetched in the one of the two switching areas and the common area which form combined areas are invalidated, and the other of the two switching areas of an unconnected area are combined with the common area.

Consequently, a destination instruction is prefetched in accordance with a detection of a conditional jump instruction and the branch instruction is carried out when a branch condition of the conditional jump instruction is fulfilled. Further, a prefetched instruction in the one switching area which is released from the common area is invalid, the one switching area becomes a new area for storing a new destination instruction. Therefore, the instructions are carried out with flexibility when conditional jump instructions are continued. Furthermore, the capacity of the each switching area is determined so that a bottleneck in an instruction processing is avoided, and is suitable for a number of destination instructions, so that the capacity of the buffer is not enlarged and a hardware scale is made small.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

An embodiment of a data processing device according to the present invention will be explained in detail with reference to the drawings.

Figure 1:
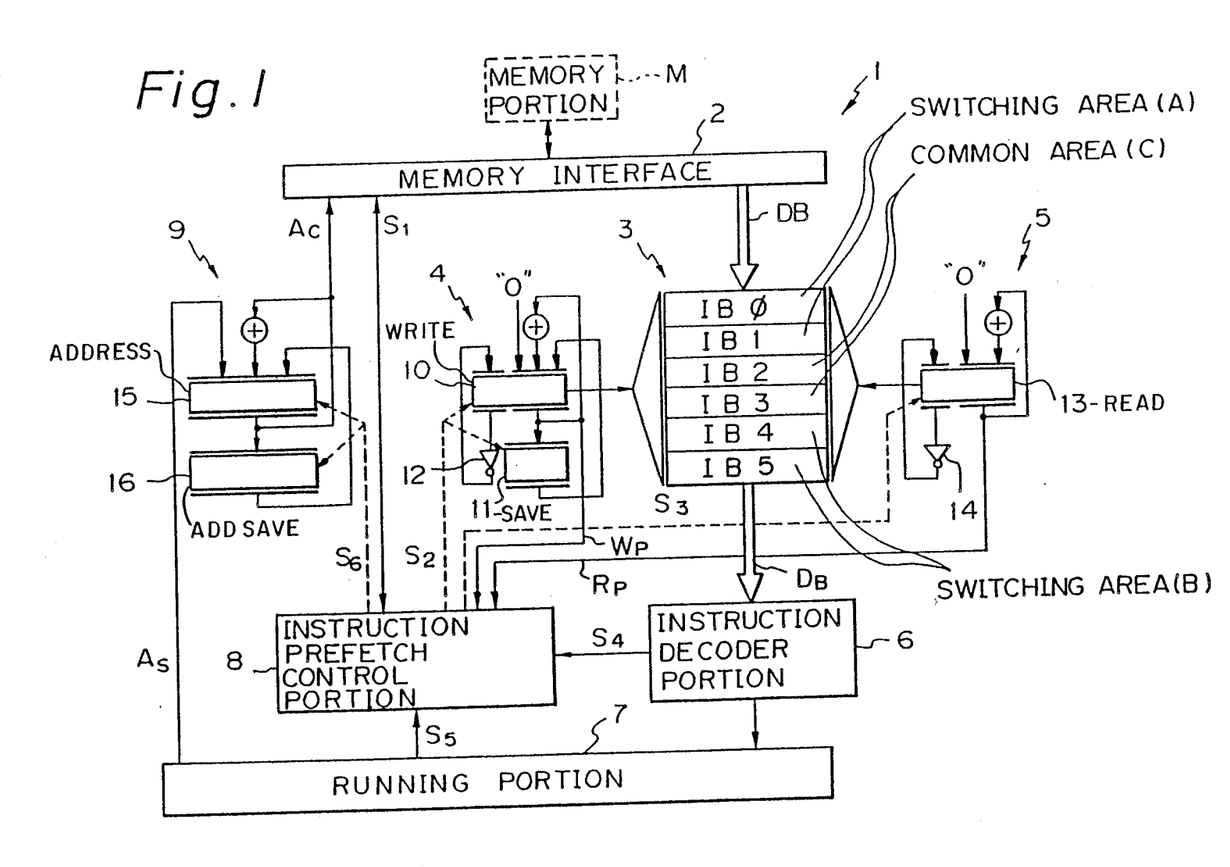
FIG. 1 is a block diagram illustrating an embodiment of a data processing device according to the present invention.

FIG. 1 is a block diagram illustrating an embodiment of a data processing device according to the present invention.

First, the construction of the present example will be explained. A microprocessor unit 1 comprises a memory interface 2, an instruction prefetch buffer 3, a write pointer portion 4, a read pointer portion 5, an instruction decoder 6, a running portion 7, an instruction prefetch control portion 8, and an address counter 9.

The memory interface 2 is connected to a memory M, such as an external memory or a cache memory, wherein instructions are stored in accordance with an address number. When an instruction fetch control signal $S_1$ from the control portion 8, described below, is input to the memory interface 2, reference is made to an address counter value Ac of the address counter 9, described below, and an instruction at a specific address indicated by the counter value Ac is fetched and transferred to a data bus.

The instruction prefetch buffer portion 3 has a plurality of storage areas (in this embodiment, six storage areas) IB0–IB5, and these areas are divided into three areas. Namely, a switching area (A) is formed by the storage areas IB0 and IB1, a switching area (B) is formed by the storage areas IB4 and IB5, and a common area (C) is formed by the storage areas IB3 and IB4. Each of the storage areas IB0–IB5 has, for example, an 8-byte configuration and a valid bit.

The switching area (A) of the storage areas IB0 and IB1, the switching area (B) of the storage areas IB4 and IB5, and the common area (C) of the storage areas IB2 and IB3 are connected or combined in accordance with a most significant bit of each pointer value Wp, Rp of the write pointer portion 4 or the read pointer portion 5. Namely, the common area (C) is connected to the switching area (A) or the switching area (B), when the common area (C) is connected to the switching area (A), connected (combined) area are formed by the common area (C) and the switching area (A), and an unconnected (uncombined) area is formed by the switching area (B). In a normal state, instructions from the memory M are prefetched to the connected areas of the common area (C) and the switching area (A). In the instruction decoder portion 6, described below, when a conditional jump instruction, for example, a Bcc instruction, (hereinafter, called a Bcc instruction) is detected, a destination instruction is fetched from the memory M in accordance with a counter value Ac indicated by the Bcc instruction and is written to the unconnected area (B). Namely, many instructions which include the above destination instruction are prefetched to the unconnected area of the switching areas (B). Conversely, if the common area (C) is connected to the switching area (B), the connected areas are formed by the common area (C) and the switching area (B), and the unconnected area is formed by the switching area (A). In a normal state, instructions from the memory M are prefetched to the connected areas of the common area (C) and the switching area (B). When a Bcc instruction is detected by the instruction decoder portion 6, a destination instruction is prefetched to the unconnected area of the switching areas (A).

The write pointer portion 4 comprises a write pointer 10 formed by a plurality of bits (in this embodiment, three bits are used, and hereinafter, this embodiment is explained by these three bits), a bit save register 11 having bits corresponding to low order bits (in this embodiment, two low order bits are used, and hereinafter, this embodiment is explained by these two bits), and an inverter 12 for inverting a most significant bit of the write pointer 10, if necessary.

The write pointer portion 4 designates the connected areas formed by the common area (C) and the switching area (A) or the common area (C) and the switching area (B). Namely, the write pointer 10 of the write pointer portion 4 changes the values of the two low order bits of the three bits "0 0", "0 1", "1 0", "1 1" or "1 1" to "0 0", cyclically as a wraparound, in accordance with a control signal $S_2$ from the instruction prefetch control portion 8. Note, the most significant bit of the write pointer 10 is used for switching the above switching areas (A) and (B) to the common area (C) of the buffer portion 3. For example, when the most significant bit of the write pointer 10 is "0", the switching area (A) is connected to the common area (C).

Therefore, the instructions fetched from the memory M are written to the switching area (A) and the common are (C), i.e., the instructions fetched from the memory M are written to a designated storage area of the storage areas IB0–IB3 in accordance with the two low order bits of the write pointer 10. Further, the write pointer 10 designates one of the storage areas IB0–IB3 of the connected areas (A) and (C), and the instructions from the memory M are prefetched to the designated storage area of the connected areas (A) and (C), in a normal state. When a conditional jump instruction is detected by the instruction decoder portion 6, the write pointer 10 designates a storage area IB4 or IB5 of the unconnected area (B) and a destination instruction of the conditional jump instruction is prefetched from the memory M to the designated storage area IB4 or IB5 of the unconnected area (B). Conversely, when the most significant bit of the write pointer 10 is "1", the switching area (B) is connected to the common area (C), the storage areas IB2–IB5 of the connected areas are designated successively, and the instructions read out from the memory M are prefetched to the designated storage area of the connected areas (B) and (C), in a normal state. When a conditional jump instruction is detected by the instruction decoder 6, the write pointer 10 designates a storage area IB0 or IB1 of the unconnected area (A), and a destination instruction of the conditional jump instruction is prefetched from the memory M to the designated storage area IB0 or IB1 of the unconnected area (A).

Figure 2:
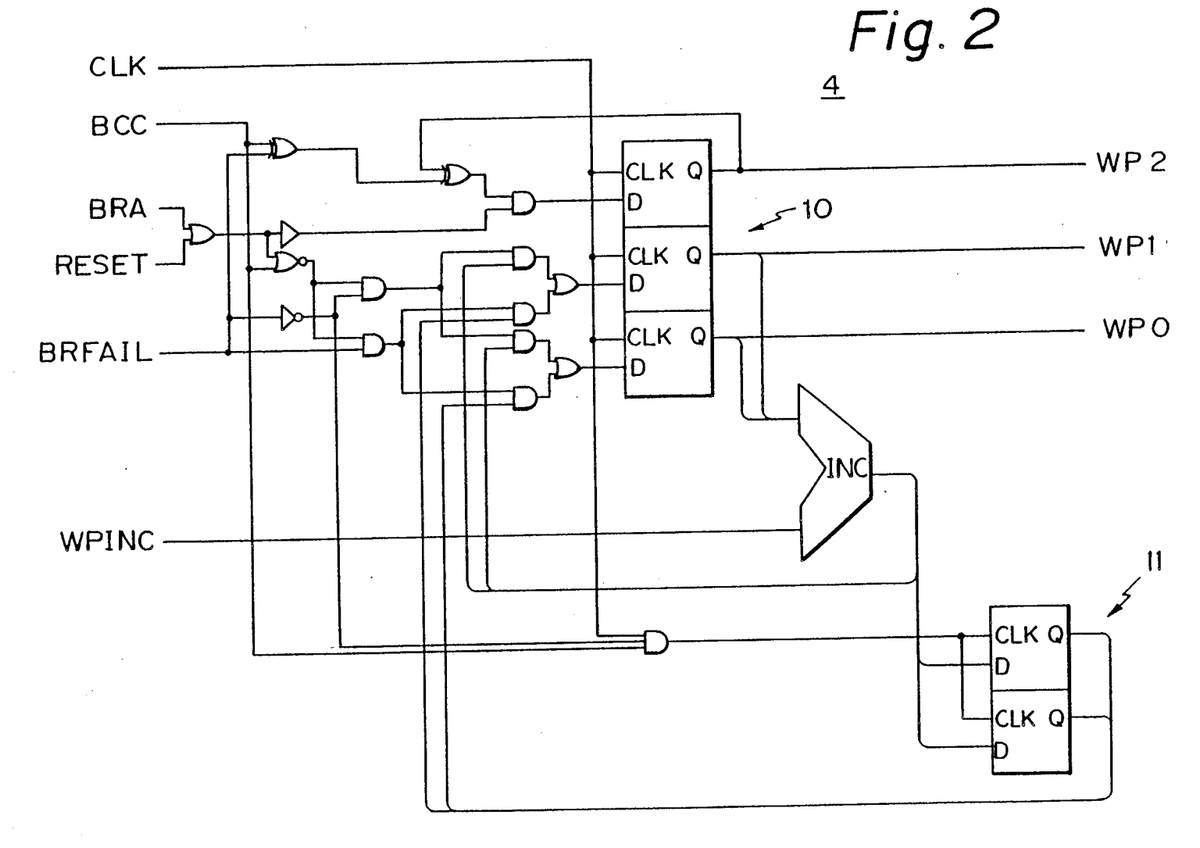
FIG. 2 is a circuit diagram illustrating an example of a write pointer portion shown in FIG. 1.

FIG. 2 is a circuit diagram illustrating an example of the write pointer portion 4 shown in FIG. 1. As shown in FIG. 2, the write pointer portion 4 is constructed, for example, by a plurality of logic gate circuits, an adder INC, and five D-type flip-flop circuits. The write pointer 10 includes the logic gate circuits operated by the signals below, and three D-type flip-flop circuits for outputting three bits of the write pointer. The signals applied to the write pointer 10 are, for example, a BCC signal indicating a branch on condition instruction, a BRA signal indicating a branch always instruction, a RESET signal for resetting the bits of the write pointer 10, and a BRFAIL signal indicating that the branch condition is not fulfilled. Further, a CLK signal is applied to each clock terminal CLK of the flip-flop circuits. The bit save register 11 includes two D-type flip-flop circuits for saving the two low order bits of the three bits. The adder INC is used for increasing the two low order bits of the three bits by +1.

When a Bcc instruction is detected and a destination instruction is fetched, the BCC signal is turned ON, the most significant bit WP2 is inverted, and the two low order bits WP1, WP0 are cleared. At the same time, the two low order bits WP1, WP0 are stored in the bit save register 11 of the two D-type flip-flop circuits, to save the contents of the two low order bits if the branch condition is not fulfilled. When the branch condition of the Bcc instruction is not fulfilled, the BRFAIL signal is turned ON, the most significant bit WP2 is inverted, and the two low order bits WP1, WP0 are copied from the contents of the bit save register 11. When the Bcc instructions are continued and both the BRFAIL signal and the BCC signal are turned ON at the same time, the most significant bit WP2 is not inverted, and the two low order bits WP1, WP0 are cleared. When a BRA instruction is detected, all three bits WP2, WP1, WP0 are cleared.

A SPINC signal is turned ON and the two low order bits WP1, WP0 are incremented by +1, when a write process for one storage area IB0–IB5 in the buffer portion 3 is carried out.

Note, Table 1 indicates the relationships between a pointer value Wp of the write pointer 10 and the storage areas IB0–IB5. Note, the content of Table 1 can be applied to a pointer value Rp of the read pointer 13.

TABLE 1

| POINTER VALUE Wp, Rp OF WRITE POINTER AND READ POINTER | | AREA DESIGNATED BY | |
|---|---|---|---|
| MOST SIGNIFICANT BIT | TWO LOW ORDER BITS | POINTER VALUE | AREA |
| 0 | 0  0 | IB0 | (A) |
|   | 0  1 | IB1 |     |
|   | 1  0 | IB2 | (C) |
|   | 1  1 | IB3 |     |
| 1 | 0  0 | IB4 | (B) |
|   | 0  1 | IB5 |     |
|   | 1  0 | IB2 | (C) |
|   | 1  1 | IB3 |     |

Next, when the Bcc instruction is detected by the instruction decoder portion 6, described below, the two low order bits of the write pointer 10 are saved to the bit save register 11, and then the two low order bits of the write pointer 10 are cleared by writing "0" and the most significant bit thereof is inverted. For example, when the most significant bit before inversion is "0", one area of the switching area (A) and the common area (C) is designated, a storage area IB4 of the unconnected switching area (B) is first designated in accordance with the inversion of the most significant bit (for example, "0"→"1" and the clearing of the two low order bits. Next, the two low order bits are incremented by +1, so that the next storage area IB5 is designated. Therefore, when the Bcc instruction is detected, two words of destination instructions, for example, are prefetched into the storage areas IB4 and IB5. Note, when the most significant bit is "0", the two destination instructions are prefetched into the storage areas IB0 and IB1.

The read pointer portion 5 has almost the same configuration as the above described write pointer portion 4, except that the bit save register 11 is not provided at the read pointer portion 5. Namely, the read pointer portion 5 comprises a read pointer 13 formed by a three bits configuration, and an inverter 14 for inverting a most significant bit of the read pointer 13, if necessary. A read area of the instruction prefetch buffer portion 3 is designated in accordance with a pointer value Rp of the pointer 13. The pointer value Rp of the two low order bits is cyclically changed as a wraparound in accordance with a control signal $S_3$ from the instruction prefetch control portion 8, and the most significant bit thereof is inverted, if necessary.

Figure 3:
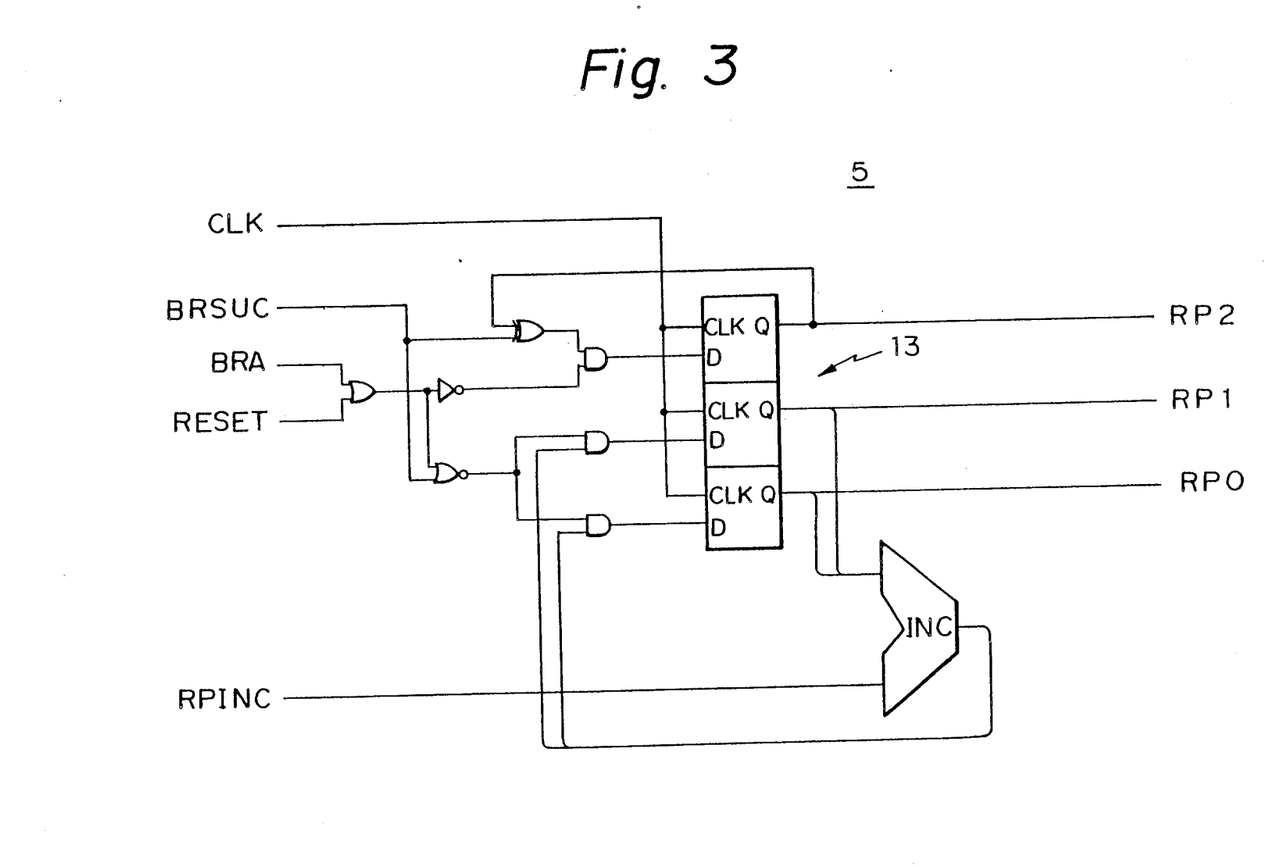
FIG. 3 is a circuit diagram illustrating an example of a read pointer portion shown in FIG. 1.

FIG. 3 is a circuit diagram illustrating an example of the read pointer portion 5 shown in FIG. 1. As shown in FIG. 3, the read pointer portion 5 is constructed, for example, by a plurality of logic gate circuits, an adder INC, and three D-type flip-flop circuits. The read pointer 13 includes the logic gate circuits for operating the signals below, and three D-type flip-flop circuits for outputting three bits of the read pointer. The signals applied to the read pointer 13 are, for example, a BRSUC signal indicating a fulfillment of the branch condition, a BRA signal indicating a branch always instruction, and a RESET signal for resetting the bits of the read pointer 13. Further, a CLK signal is applied to each clock terminal CLK of the flip-flop circuits. The read pointer portion 5 does not include the bit save register provided for the write pointer portion 4. The adder INC is used for increasing the two low order bits of the three bits by +1.

When the branch condition of the Bcc instruction is fulfilled, the BRSUC signal is turned ON, the most significant bit RP2 is inverted, and the two low order bits RP1, RP0 are cleared. In the case of a BRA instruction, all three bits RP2, RP1, RP0 are cleared. An RPINC signal is turned ON and the two low order bits RP1, RP0 are incremented by +1, when all of the content of one storage area IB0–IB5 in the buffer portion 3 is read out.

In the instruction decoder 6, an instruction is read out from the instruction prefetch buffer 3 by a designation of the pointer 13 and is decoded, and the result is sent to the running portion 7. When the instruction read out from the instruction prefetch buffer portion 3 is a Bcc instruction, a command for a discriminate processing of a branch condition is output to the running portion 7, and a branch instruction detect signal $S_4$ indicating a branch instruction is output to the instruction prefetch control portion 8.

In the running portion 7, various processes are carried out in accordance with a notification from the instruction decoder 6, and when the command for the discriminate processing is input, a discrimination of whether or not the branch condition is fulfilled is carried out and a decision signal $S_5$ indicating a result of the discrimination is output to the instruction prefetch control portion 8.

Generally, the instruction prefetch control portion 8 monitors the existence or non-existence of an empty area by determining a difference between a pointer value Wp of the write pointer 10 and a pointer value Rp of the read pointer 13. When an empty area exists, an instruction fetch signal $S_1$ and a control signal $S_6$ are output, and an instruction from the memory M is prefetched to the empty area.

Further, when a branch instruction detect signal $S_4$ from the instruction decoder 6 is input, the write pointer portion 4 is controlled and a write area of the instruction prefetch buffer 3 is switched and connected to the switching area (A) or (B) which is not connected to the common area (C), and a destination instruction formed, for example, by two words, is stored to the switched areas. Note, a pointer value Rp of the read pointer 13 is maintained and the connected areas of the buffer portion 3 are designated to a read side, until a discriminate signal $S_5$ is input from the running portion 7, i.e., a result of a discrimination of the conditions is input. Therefore, a destination instruction is not read from the buffer portion 3 until the discriminate signal $S_5$ is input.

When the discriminate signal $S_5$ is input, and this discriminate signal $S_5$ indicates that the branch condition has been fulfilled, the control signal $S_3$ is output, the most significant bit is inverted, and the two low order bits are cleared, and the switching area (A) or (B) where the destination instruction is stored is designated to the read side. Consequently, when the branch condition is fulfilled, the destination instruction is fetched to the instruction decoder 6, and a branch processing is carried out.

The address counter portion 9 comprises an address register 15 and an address save register 16, and a register value of the address register is output as an address counter value Ac of the address register 15. Further, in the address register 15, a register value is updated in accordance with a control signal $S_6$ from the instruction prefetch control portion 8, and a register value is also updated to a value indicted by a destination branch address signal As, when the destination branch address signal As is input. Note, a register value before updating is saved to the address save register 16 and the previous register value is returned to the address register 15 when the branch condition is not fulfilled.

Next, a mode of operation is explained.

Figure 4:
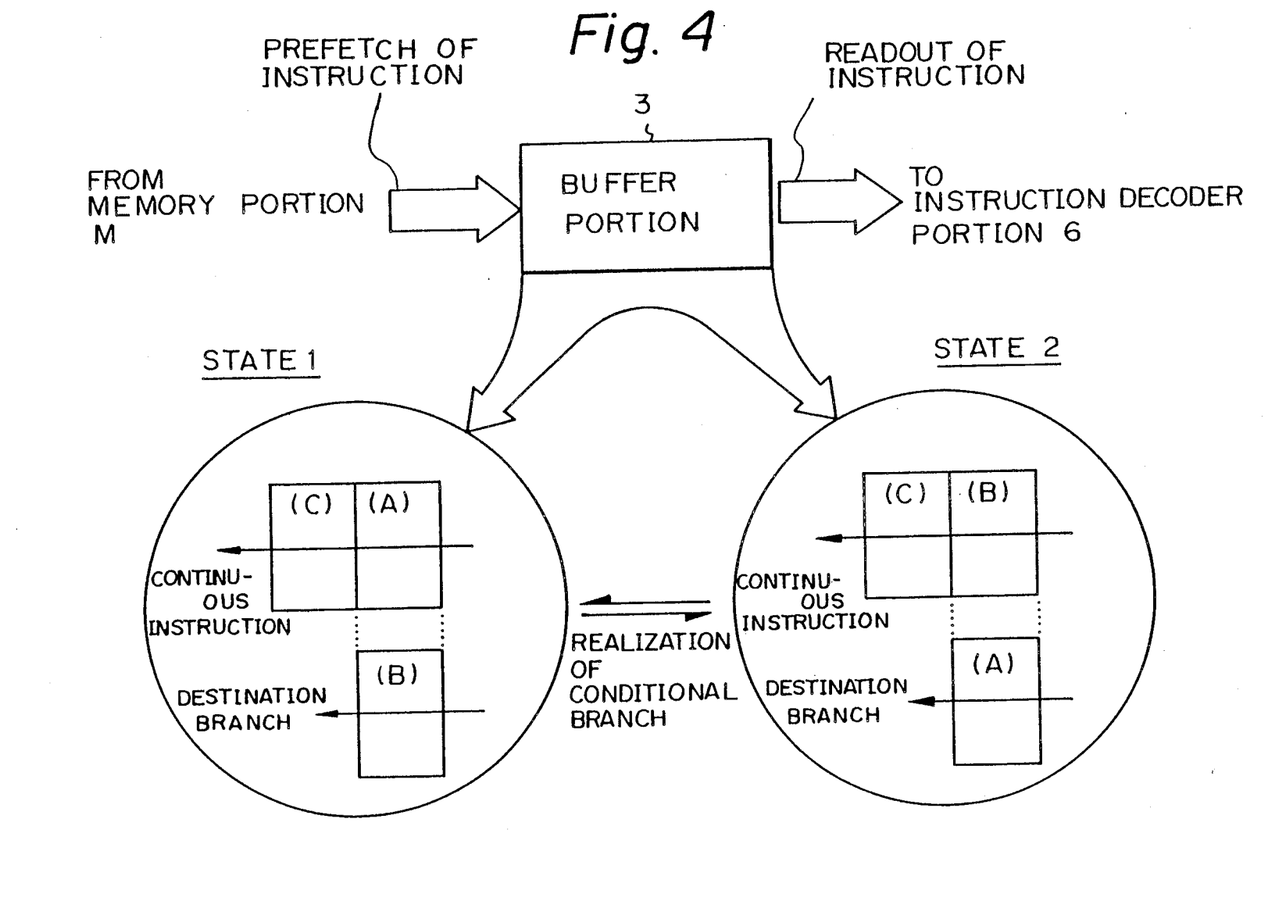
FIG. 4 is a concept drawing explaining a mode of operation thereof.

First, a concept of the operation is explained with reference to FIG. 4. Generally, a prefetch of an instruction is divided into two cases; one using a continuous instruction processing and the other using a branch instruction (which includes a conditional jump instruction and a unconditional jump instruction).

A normal continuous processing instruction is, for example, prefetched to a connection relationship of a switching area (A) and a common area (C) as shown in state 1. When a branch instruction is detected during continuous processing, the destination instruction is prefetched to a switching area (B) which is not related to the connection relationship. When a connection relationship as shown in state 2 is established, the above switching areas (A) and (B) are changed.

When the detected branch instruction is a conditional jump instruction, the condition thereof is discriminated to determine whether or not the condition is fulfilled, and when the condition is not fulfilled, the continuous instructions are carried out in keeping with the connection relationship of the state 1 or 2. On the other hand, when the condition is fulfilled, the connection relationship is changed and a new connection relationship is established, that is, the switching area (A) or the switching area (B) to which the destination instruction has been prefetched is connected to the common area (C) and carries out the destination instruction now considered to be a continuous instruction. The above description indicates that the state 1 is changed to the state 2 when the condition is fulfilled. As a result, the unconnected switching area (A) or (B) is then used for prefetching a destination instruction, and if branch instructions are continued, the instructions can be flexibly carried out. Furthermore, the capacity of each of the switching areas (A) and (B) can be small enough to allow a fetch of the destination instruction (for example, 2 words) without generating a bottleneck in the processing, and thus the total capacity of the buffer 3 is not increased.

Next, an operation of this embodiment is described.

First, a prefetch of a normal instruction processing not accompanied by a branch instruction will be explained. Note, in the instruction prefetch buffer 3, at this stage, the switching portion (A) is connected to the common portion (C) and instructions are prefetched to the storage area IB0 only. Therefore, a present pointer value Wp of the write pointer 10 indicates Wp=001, and if an instruction of the IB0 is not read, a pointer value Rp of the read pointer 13 indicates Rp=000.

In this state, an instruction designated by the read pointer value Rp of the storage area IB0 is read by the instruction decoder 6, and the read instruction is decoded. As a result, when the instruction is a normal instruction not accompanied by a branch instruction, the running portion 7 carries out a specific processing in accordance with the decoded result of the instruction. Empty areas of the instruction prefetch buffer 3 (in this case, the storage areas IB1–IB3 are empty) are confirmed by the instruction prefetch control portion 8 in accordance with a difference between the write pointer value Wp and the read pointer value Rp, an address control signal $S_6$ is output to the address register 15, and an address counter value Ac is incremented by +1, so that instructions are prefetched to the empty areas. As described above, an instruction designated by an address of the address counter value Ac is fetched from the memory M by the memory interface 2, and the fetched instruction is transferred to the instruction prefetch buffer 3 through a data bus. The transferred instruction is prefetched to the storage area IB1 in accordance with the write pointer value Wp =001. When a prefetch of the instruction to the storage area IB1 is completed, an increment of the write pointer value Wp and a count up of the read pointer value Rp is carried out, and a plurality of instructions are prefetched to the storage area IB0–IB3 of the connected switching area (A) and the common area (C) in the instruction prefetch buffer 3. Further, the prefetched instruction is successively read from the storage areas IB0–IB3 to the instruction decoder 6, and a new instruction is prefetched to an empty area produced by the reading process.

On the other hand, when a Bcc instruction is detected by the instruction decoder 6, a present write pointer value Wp is saved to the bit save register 11 and an address counter value Ac is saved to the address save register 16. The address counter value Ac is renewed by a destination branch address signal As, the most significant bit of the write pointer 12 is inverted, the two low order bits are cleared, and an unconnected area is designated for prefetching by the write pointer value Wp. Consequently, a destination instruction is prefetched to the unconnected switching area (B). In this case, a discrimination result of the condition in the destination instruction is not produced, the read pointer value Rp is maintained as the same value, and a read side area is designated to a connecting side.

Figure 5:
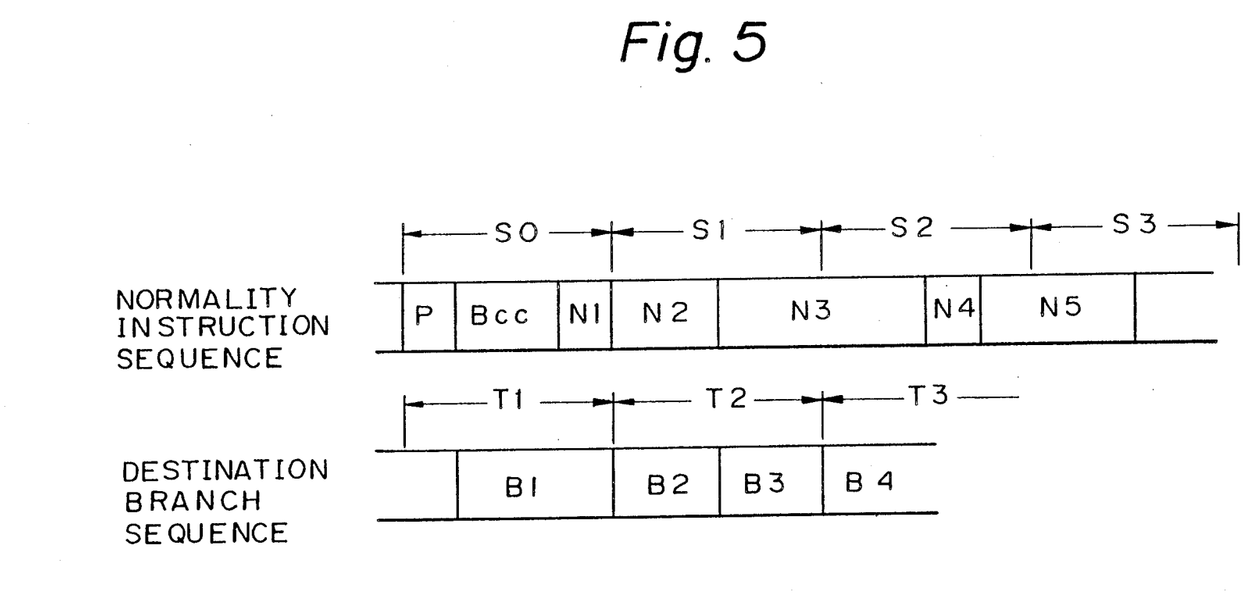
FIG. 5 is a block diagram explaining examples of a normal instruction sequence including a branch on condition code instruction and a destination instruction sequence of the branch condition code instruction in a memory portion.

FIG. 5 is a block diagram explaining examples of a normality instruction sequence including a branch on condition code instruction and a destination instruction sequence of the branch on condition code instruction in a memory. In FIG. 5, references S0–S3 and T1–T3 denote address counter values which correspond to one cycle of the pipeline system, and references P, Bcc, N1–N5, and B1–B5 denote instructions. The counter values S0–S3 are in a normal prefetch cycle, i.e., these instructions P, Bcc and N1–N5 are continuous instructions and these continuous instructions are carried out successively in accordance with the address numbers thereof when a branch condition of the Bcc instruction is not fulfilled. Conversely, the counter values T1–T3 are in a branch prefetch cycle, and a destination instruction of the Bcc instruction and continuous instructions thereof are included in the cycle T1, i.e., the instruction B1 corresponds to the destination instruction of the Bcc instruction and these instructions B2–B4 are continuous instructions, and these continuous instructions are carried out successively when a branch condition of the Bcc instruction is fulfilled. Note, the above instructions P, Bcc, N1–N5, and B1–B5 are variable length instructions, and thus each of the instructions may not be prefetched in the same cycle or to one storage area IB-0–IB5. For example, the instruction N3 is divided into two cycles S1 and S2, i.e., a front portion of the instruction N3 is prefetched to one storage area and a rear portion of the instruction N3 is prefetched to the other storage area.

Next, the case of a detection of a Bcc instruction is explained with reference to FIGS. 6 and 7.

When a branch condition of a Bcc instruction is not fulfilled.

The destination branch address signal As is returned by a register value saved in the address save register 16, and the write pointer value Wp is also returned by a value of the save register 11. Therefore, in the postprefetch processes, the connecting side switching area (A) and the common area (C) are used, i.e., the processing state is returned to a normal state of carrying out continuous instructions.

Figure 6:
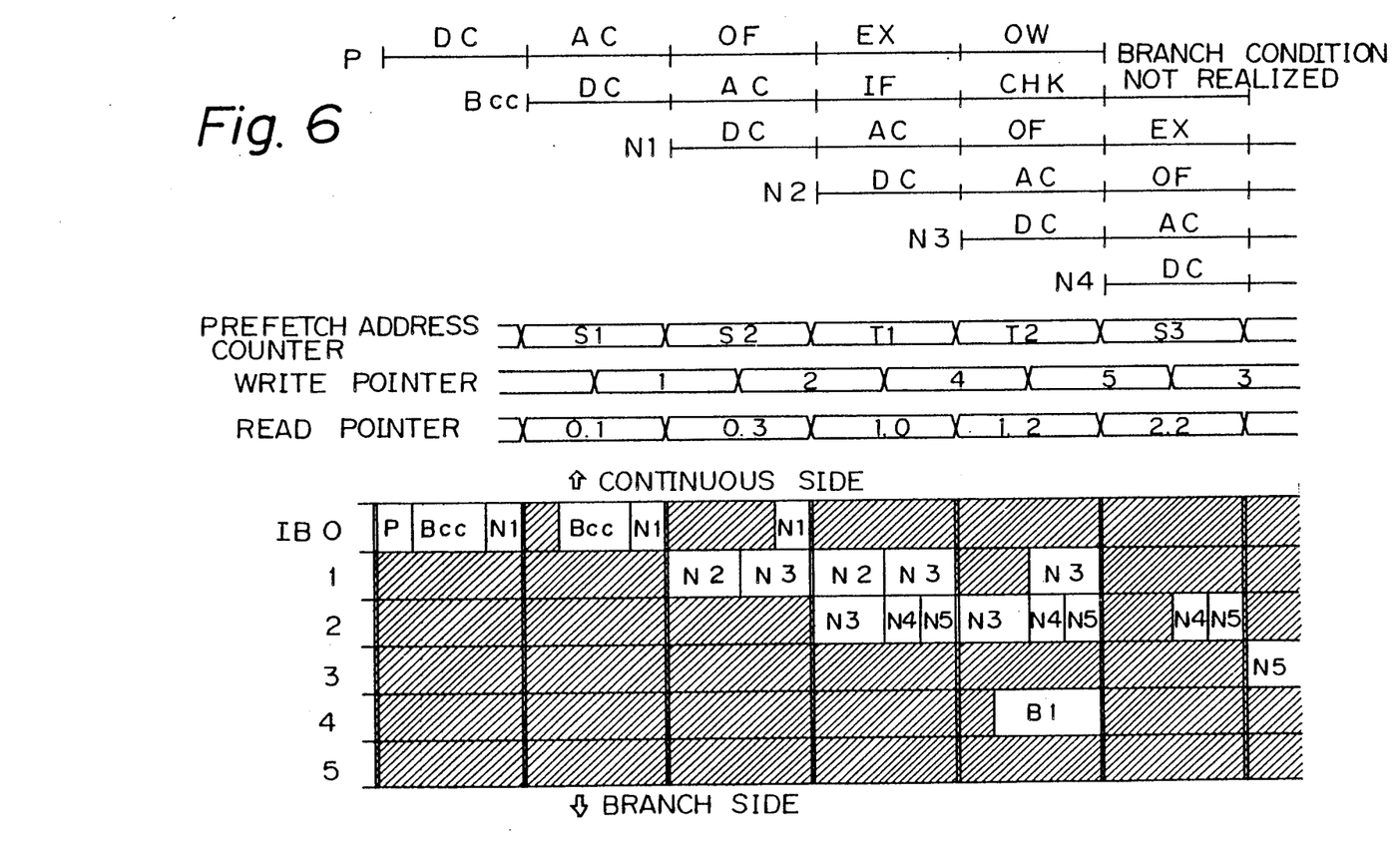
FIG. 6 is a block diagram explaining the case wherein the branch on condition code instruction is not realized; and, FIG. 7 is a block diagram explaining the case wherein the branch on condition code instruction is realized.

FIG. 6 is a block diagram explaining the case wherein a condition of the branch on condition code instruction is not fulfilled. As shown in FIG. 6, in a first cycle of a first step in a five step pipeline system the instruction P is decoded (DC), in a second cycle of the first step an effective address is calculated (AC), and in a third cycle of the first step an operand of the instruction P is fetched (OF). Further, in a fourth cycle of the first step an operation of the instruction P is executed (EX), and in a fifth cycle of the first step the operand of the instruction P is written and a condition codes are generated (OW).

In a first cycle of a second step, which corresponds to the second cycle of the first step, for example, the Bcc instruction is decoded (DC). In a second cycle of the second step an effective address is calculated (AC), and in a third cycle of the second step a destination instruction of the Bcc instruction is fetched (IF). Further, in a fourth cycle of the second step a branch condition of the Bcc instruction is checked or discriminated (CHK). Note, in the first and second cycles (DC, AC) of the second step, which correspond to the second and the third cycles (AC, OF) of the first step in a five step pipeline system, address counter values are indicated as S1 and S2 in the normal prefetch cycle, and in the third and fourth cycles (IF, CHK) of the second step, which correspond to the fourth and fifth cycles (EX, OW) of the first step in a five step pipeline system, address counter values are indicated as T1 and T2 in the branch prefetch cycle. Further, in the fifth cycle of the second step, which corresponds to a fourth cycle (EX) of the third step in a five step pipeline system, an address counter value is indicated as S3 in the normal prefetch cycle, since a branch condition of the Bcc instruction is not fulfilled.

In this case, the write pointer 10 designates the storage areas IB0, IB1, IB2, IB4, IB5 and IB3 by the two low order bits thereof, i.e., the write pointer 10 designates the connected storage areas IB0, IB1 and IB2 until the third cycle (IF) of the second step, the write pointer 10 then designates the unconnected storage area IB4 and IB5 in order to prefetch a destination instruction of the Bcc instruction, and then the write pointer 10 designates the connected storage area IB3, since the branch condition of the Bcc instruction is not fulfilled.

Therefore, in the second cycle (AC) of the first step, an instruction N2 and a front portion of an instruction N3 are prefetched from the memory M to the storage area IB1 by designation of the write pointer 10. Similarly, in the third cycle (OF) of the first step corresponding to the second cycle (AC) of the second step, a rear portion of the instruction N3, an instruction N4, and a front portion of an instruction N5 are prefetched from the memory M to the storage area IB2 by the designation of the write pointer 10. Next, in the fourth cycle (EX) of the first step corresponding to the third cycle (IF) of the second step, a destination instruction B1 is prefetched from the memory M to the storage area IB4, which is an unconnected storage area. In the fifth cycle (OW) of the first step corresponding to the fourth cycle (CHK) of the second step, an instruction B2 and an instruction B3 are prefetched from the Memory M to the storage area IB5. However, after the fourth cycle (CHK) of the second step, the storage area IB4 and IB5 are invalidated, since the branch condition of the Bcc instruction is not fulfilled. Further, in the fifth cycle of the second step corresponding to a fourth cycle (EX) of a third step and a fifth cycle of the third step, a rear portion of the instruction N5 is prefetched from the memory M to the storage area IB3, which is a connected storage area, since the branch condition of the Bcc instruction is not fulfilled. In the above description, in the first cycle (DC) of the second step, the read pointer 13 designates an instruction start position of the connected storage area IB0 (0, 1), and in the second, third fourth and fifth cycles of the second step, the read pointer 13 designates instruction start positions of the connected storage areas (0, 3), (1, 0), (1, 2) and (1, 4), respectively. Note, the read pointer 13 does not designate a start position of the unconnected storage areas IB4 and IB5, since the branch condition of the Bcc instruction is not fulfilled.

When a branch condition of a Bcc instruction is fulfilled.

The most significant bit of the read pointer value Rp is inverted, and a read area is switched to the side for a prefetch of the destination instruction. Therefore, an instruction of the destination branch is read to the instruction decoder 6, so that a branch processing is carried out. The next continuous instruction is prefetched to the switching area (B) and the common area (C), which are now in a connected relationship, and the previous prefetched instructions of these areas become invalid. Further, the switching area (A) which is now unconnected is secured for prefetching future destination instructions, and thus if the Bcc instruction are continued, the destination instruction is prefetched to the switching area (A) of the unconnected side, so that it can be flexibly corresponded when the continuous Bcc instructions are detected. Furthermore, a capacity of each of the switching area (A) or the switching area (B) is determined such that a bottleneck in an instruction processing is avoided, and is suitable for a number of destination instructions, so that a total capacity of the instruction prefetch buffer 3 is not enlarged and the hardware scale is reduced.

Note, when an unconditional jump instruction such as a BRA instruction is detected by the instruction decoder 6, a destination branch address signal As is loaded to the address register 15 and an address counter value Ac is updated. Further, in the case of the unconditional jump instruction, the connecting switching areas (A) or (B) and the common area (C) can be designated for prefetching a destination instruction by clearing the write pointer value Wp and read pointer value Rp.

Figure 7:
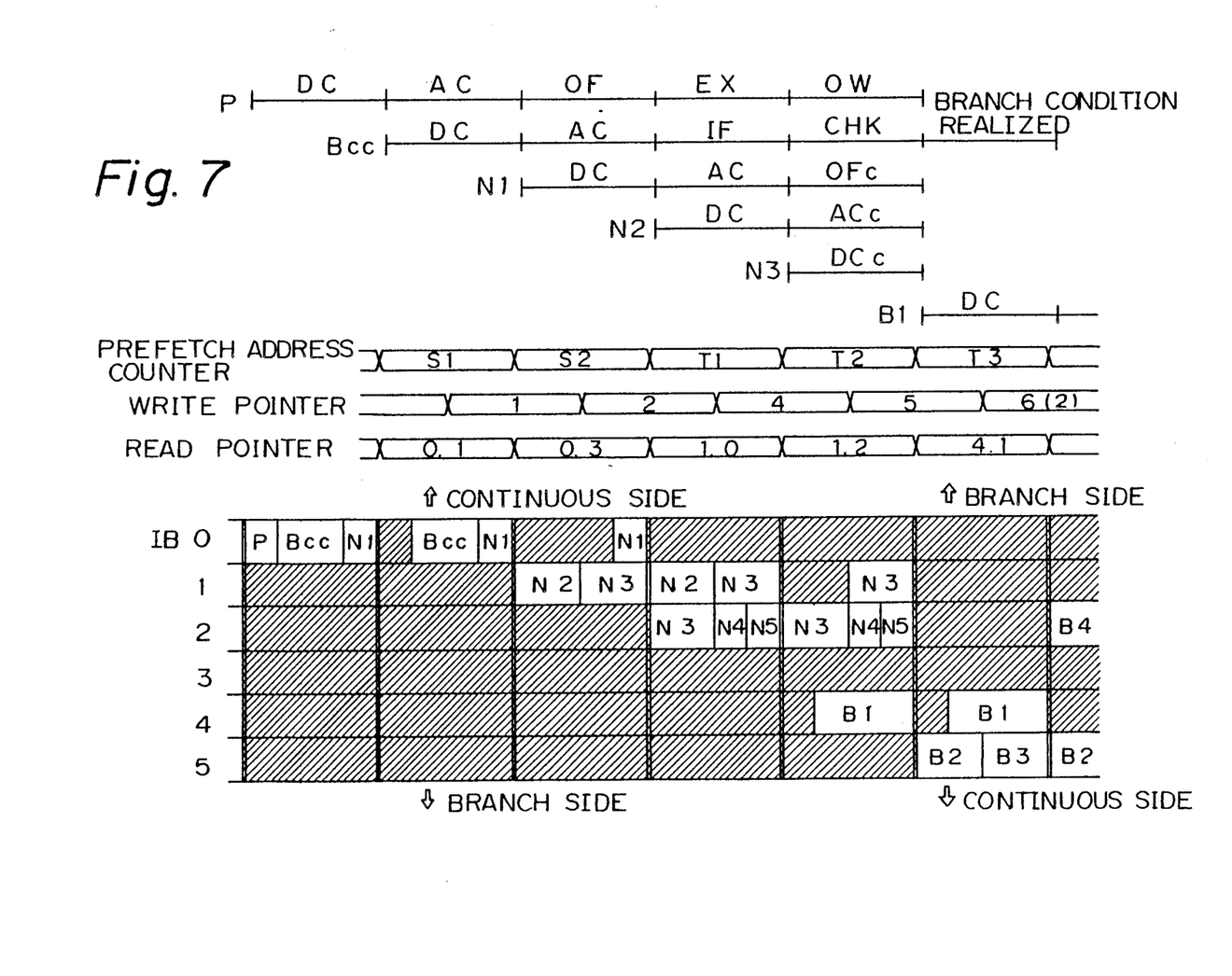

FIG. 7 is a block diagram explaining the case wherein, the branch on condition code instruction is fulfilled. As shown in FIG. 7, the first to fifth cycles of the first step and the first to fourth cycles of the second step are the same as that of FIG. 6. In a first cycle of a second step, which corresponds to the second cycle of the first step, the Bcc instruction is decoded (DC), in a second cycle of the second step an effective address is calculated (AC), and in a third cycle of the second step a destination instruction of the Bcc instruction is fetched (IF). Further, in a fourth cycle of the second step a branch condition of the Bcc instruction is checked or discriminated (CHK). Note, in the first and second cycles (DC, AC) of the second step, which correspond to the second and the third cycles (AC, OF) of the first step in a five step pipeline system, address counter values are indicated as S1 and S2 in the normal prefetch cycle, and in the third and fourth cycles (IF, CHK) of the second step, which correspond to the fourth and fifth cycles (EX, OW) of the first step in a five step pipeline system, address counter values are indicated as T1 and T2 in the branch prefetch cycle. Further, in the fifth cycle of the second step which corresponds to a fourth cycle (EX) of the third step in a five step pipeline system, an address counter value is indicated as T3 in the normal prefetch cycle, since a branch condition of the Bcc instruction is fulfilled. In this case, the write pointer 10 designates the storage areas IB0, IB1, IB2, IB4, IB5 and IB2 by the two low order bits thereof, i.e., the write pointer 10 designates the connected storage areas IB0, IB1 and IB2 until the third cycle (IF) of the second step, the write pointer 10 then designates the unconnected storage area IB4 and IB5 in order to prefetch a destination instruction of the Bcc instruction, and then the write pointer 10 designates a new connected storage area IB2, since the branch condition of the Bcc instruction is fulfilled. Note, the storage areas IB2 and IB3 of the common area (A) are newly connected to the storage areas IB4 and IB5 of the switching area (B) in accordance with the most significant bit of the write pointer 10.

Therefore, in the second cycle (AC) of the first step, an instruction N2 and a front portion of an instruction N3 are prefetched from the memory M to the storage area IB1 by the designation of the write pointer 10, and similarly, in the third cycle (OF) of the first step corresponding to the second cycle (AC) of the second step, a rear portion of the instruction N3, an instruction N4, and a front portion of an instruction N5 are prefetched from the memory M to the storage area IB2 by the designation of the write pointer 10. Next, in the fourth cycle (EX) of the first step corresponding to the third cycle (IF) of the second step, a destination instruction B1 is prefetched from the memory M to the storage area IB4 which is an unconnected storage area in this cycle. In the fifth cycle (OW) of the first step corresponding to the fourth cycle (CHK) of the second step, an instruction B2 and an instruction B3 are prefetched from the memory M to the storage area IB5. Further, in the fifth cycle of the second step corresponding to a fourth cycle (EX) of a third step, the switching area (A) formed by the storage areas IB0 and IB1 is separated from the common area (C) formed by the storage areas IB2 and IB3, and the switching area (B) formed by the storage areas IB4 and IB5 is newly connected to the common area (C) in accordance with the most significant bit of the write pointer 10, since the branch condition of the Bcc instruction is fulfilled. In the above description, in the first cycle (DC) of the second step, the read pointer 13 designates an instruction start position of the connected storage area IB0 (0, 1), and in the second, third, fourth and fifth cycles of the second step, the read pointer 13 designates instruction start positions of the connected storage areas (0, 3), (1, 0), (1, 2) and (4, 1), respectively. Note, the read pointer 13 designates a start position of the newly connected storage areas IB4 and IB5 by inverting the most significant bit thereof, since the branch condition of the Bcc instruction is fulfilled. In this state, if a next Bcc instruction is detected, the above processes are carried out by inverting the switching area (A) of the storage area IB0 and IB2 to the switching area (B) of the storage IB4 and IB5.

In accordance with the present invention, a buffer is constructed by including two switching areas enabling a switching and one common area connected to one of the two switching areas, an unconnected switching area of the two switching areas is made exclusive for a prefetch of a destination instruction, so that destination instructions of jump instructions are prefetched to each of the two switching areas by switching, and thus flexibility is increased, when the jump instructions are continued. Further, a number of prefetch destination instructions is determined so that a bottleneck in an instruction process is avoided, and thus the capacities of the two switching areas are reduced and the hardware scale is not enlarged.

Many widely different embodiments of the present invention may be constructed without departing from the spirit and scope of the present invention, and it should be understood that the present invention is not limited to the specific embodiments described in this specification, except as defined in the appended claims.

What is claimed:

1. A data processing device comprises:
   a buffer storing instructions, fetched from a memory, into a first area, a second area and a common area thereof;
   a decoder means, connected to said buffer, for receiving and for decoding said instructions stored in said first, second and common areas of said buffer; and
   a control means, connected to said buffer and said decoder means, for controlling which of said first, second and common areas are to be used for prefetching instructions, wherein said common area is used to prefetch instructions with either one of the first and second areas as a combined area, and wherein when a condition jump instruction is detected by said decoder means, a destination instruction, which corresponds to said conditional jump instruction, is prefetched into the other of said first and second areas designated by said control means as an uncombined area, and when a condition of said conditional jump instruction is fulfilled, said control means designates the other of said first and second areas to be used with said common area to prefetch instructions.

2. A data processing device according to claim 1, wherein said conditional jump instruction is a branch on condition code instruction.

3. A data processing device according to claim 1, wherein said first and second areas and said common area being formed by a plurality of storage areas, and said first and second areas have the same capacities.

4. A data processing device according to claim 3, wherein said each storage area includes a valid bit, and when the instructions fetched from said memory are written to a designated storage area, a valid bit of said designated storage areas is set by a setting means.

5. A data processing device according to claim 3, wherein said each storage area includes a valid bit, and when the instructions prefetched from said memory are read from a designated storage area, a valid bit of said designated storage area is cleared by a clearing means.

6. A data processing device according to claim 1, wherein said control means includes a write pointer portion, connected to said buffer, for switching which of said first, second and common area are to be used together as said combined area and designated one of the areas for writing the instructions prefetched from said memory.

7. A data processing device according to claim 6, wherein said write pointer portion designates which areas are to be used together by said one of said first and second areas and said common areas in a normal non-jump processing state, and when a conditional jump instruction is detected by said decoder means, said write pointer portion designates the uncombined area formed by the other of said first and second areas and a designation instruction corresponding to said conditional jump instruction prefetched from said memory is written into said uncombined area.

8. A data processing device according to claim 6, wherein said write pointer portion comprises a write pointer connected to said buffer and formed by a plurality of bits, a bit save register connected to said write pointer for saving low order bits of said write pointer, and an inverting circuit connected to said write pointer for inverting a most significant bit of said write pointer.

9. A data processing device according to claim 8, wherein a most significant bit of said write pointer being used for switching which of said first, second and common areas are to be used together, and low order bits of said write pointer being used for designating one of said areas for writing the instructions prefetched from said memory.

10. A data processing device according to claim 9, wherein said write pointer designates a storage area in one of said combined areas and the instructions from said memory are prefetched to said designated storage area of said combined area in a normal non-jump processing state; and when a conditional jump instruction is detected, said write pointer designates said storage area of said uncombined area and a destination instruction corresponding to said conditional jump instruction is prefetched from said memory to said designated storage area of said uncombined area.

11. A data processing device according to claim 1, wherein said control means includes a rear pointer portion connected to said buffer portion for switching which of said first, second and common areas are used together to prefetch instructions as a designated area, and designating one of said areas for reading the instructions prefetched in said designated area.

12. A data processing device according to claim 11, wherein said read pointer portion designates which of areas of said first and second areas and said common area are to be used together in a normal non-jump processing state as said designated area; and when a conditional jump instruction is detected and a condition of said conditional jump instruction is fulfilled, the other of said first and second areas is to be used with said common area in a jump processing state, and said read pointer portion designates said area in said jump processing state and a destination instruction corresponding to said conditional jump instruction stored in said jump processing state area and read therefrom.

13. A data processing device according to claim 11, wherein said read pointer portion comprises a read pointer connected to said buffer and formed by a plurality of bits, and an inverting circuit connected to said read pointer for inverting a most significant bit of said read pointer.

14. A data processing device according to claim 13, wherein a most significant bit of said read pointer being used for switching which of said first, second and common areas are used together as a combined area, and low order bits of said read pointer being used for designating one of the areas for reading the instructions therefrom.

15. A data processing device according to claim 14, wherein said read pointer designates a storage area of said combined areas and the instructions prefetched to said designated storage area of said combined areas are read out in a normal state; and when a conditional jump instruction is detected and a condition of said conditional jump instruction being fulfilled, said area which was not used is subsequently used with said common area, and said read pointer designates said storage area of said area which is not used and a destination instruction corresponding to said conditional jump instruction prefetched to said designated storage area of said area which is not used and read therefrom.

16. A data processing device according to claim 1, wherein said one of said first and second areas and said common area are used together in accordance with a write pointer value of a write pointer and a read pointer value of a read pointer.

17. A data processing device according to claim 1, wherein the instructions from said memory are prefetched and written into an area of said buffer designated by a write pointer value of a write pointer.

18. A data processing device according to claim 1, wherein the instructions from said memory are read from an of said buffer designated by a read pointer value of a read pointer.

19. A data processing device comprises:
a buffer storing instructions, prefetched from a memory, into a first area, second area and a common area thereof;
a decoder means, connected to said buffer, for receiving and for decoding said instructions stored in said first, second and common area of said buffer; and
control means, connected to said buffer and said decoder means, for controlling which of said first, second and common area are to be used for prefetching instructions, said common area is used with either one of the first and second areas as a combined area to prefetch instructions, when a conditional jump instruction is detected by said decoder means, the other of said first and second areas designated by said control means as an uncombined area is used to prefetch a destination instruction which corresponds to said conditional jump instruction; and when a condition of said conditional jump instruction is fulfilled, said control means designates the other of said first and second areas to be used with said common area to prefetch instructions wherein said common area is alternating combined with one of said first and second areas.

* * * * *